United States Patent [19]
Knezic et al.

[11] Patent Number: 5,261,247
[45] Date of Patent: Nov. 16, 1993

[54] FUZZY LOGIC APPARATUS CONTROL

[75] Inventors: Timothy M. Knezic, Evansville, Ind.; Steven J. Kuehl, Lincoln Township, Berrien County, Mich.

[73] Assignee: Whirlpool Corporation, Benton Harbor, Mich.

[21] Appl. No.: 15,115

[22] Filed: Feb. 9, 1993

[51] Int. Cl.⁵ .............................................. F25B 5/00
[52] U.S. Cl. ...................................... 62/117; 62/199; 395/61
[58] Field of Search ........................ 62/200, 117, 199; 395/61, 900, 906

[56] References Cited

U.S. PATENT DOCUMENTS

| | | | |
|---|---|---|---|
| 4,248,051 | 2/1981 | Darcy et al. | 62/115 |
| 4,798,057 | 1/1989 | Okamoto et al. | 62/228.3 |
| 4,843,833 | 7/1989 | Polkinghorne | 62/180 |
| 5,156,013 | 10/1992 | Arima et al. | 236/78 D |
| 5,184,473 | 2/1993 | Day | 62/199 |

Primary Examiner—William E. Wayner
Attorney, Agent, or Firm—Stephen D. Krefman; Thomas J. Roth; Thomas E. Turcotte

[57] ABSTRACT

A method and apparatus for sequentially operating a refrigeration system with multiple evaporators is provided in which only one evaporator is operated at a time and is run until a set of fuzzy logic rules determines that one of the other evaporators should be operated or that the operation of the evaporators should be terminated.

20 Claims, 10 Drawing Sheets

| COMP. STATE | | # | RULE |
|---|---|---|---|
| Ff | 0 | 0 | IF FfDIFF IS NEG THEN OFF |
| | 1 | 0a | IF FfGRAD IS Sm THEN Ff |
| | 2 | 0b | IF FZDIFF IS PS THEN FZ |
| | 3 | 0c | IF FZ GRAD IS Sm THEN Ff & OFF |
| | 4 | 1 | IF FZDIFF IS PL THEN FZ |
| | 5 | 1a | IF TIME IS SHORT THEN Ff |
| | 6 | 2 | IF OFF > Ff AND PCM IS NOT (SUBCOOLED) THEN SUBCOOL |
| FZ | 7 | 3 | IF FZDIFF IS NEG THEN OFF |
| | 8 | 3a | IF FZGRAD IS Sm THEN FZ |
| | 9 | 3b | IF FfDIFF IS PS THEN Ff |
| | 10 | 3c | IF FfGRAD IS Sm THEN FZ & OFF |
| | 11 | 4 | IF FfDIFF IS PL THEN Ff |
| | 12 | 4a | IF TIME IS SHORT THEN FZ |
| | 13 | 5 | IF FfDIFF IS PM THEN PCM |
| OFF | 14 | 6 | IF FfDIFF IS PM THEN Ff |
| | 15 | 7 | IF FZDIFF IS PM THEN FZ |
| | 16 | 8 | IF FfDIFF IS PS THEN PCM |

NOTE: RULES 0a-0c, 1a, 3a-3c & 4a iff 0,1,3 & 4 FIRE, RESPECTIVELY

FUZZY LOGIC APPARATUS CONTROL

BACKGROUND OF THE INVENTION

The present invention relates to refrigeration appliances and more particularly to a method for operating refrigeration appliances having multiple evaporators.

In typical domestic refrigeration appliances, the appliance oftentimes has two separate compartments which are maintained at different temperatures. For example, there may be a freezer compartment which has a temperature maintained below 0° C. and a fresh food compartment which is maintained at a temperature somewhat above 0° C.

In many commercially available refrigeration devices a single evaporator is used with an evaporating pressure of approximately 0-2 psig. Air is circulated over the evaporator from both the freezer compartment and the refrigerator compartment. This "mixed" air flow scheme results in dehumidification of the refrigerator compartment and subsequent frost build-up on the single evaporator coil, necessitating a periodic defrost cycle to get rid of the accumulated frost.

Also, using a single evaporator to provide the cooling for two compartments which are maintained at different temperatures results in an inefficient use of the refrigeration system for the higher temperature compartment.

It is known in the art to utilize multiple evaporators in refrigeration appliances. U.S. Pat. No. 2,576,663 discloses the use of two evaporators, each for its own refrigeration compartment. The evaporators are alternately supplied with refrigerant through a control valve.

U.S. Pat. No. 3,390,540 discloses the use of multiple evaporators in a refrigeration system. Each evaporator is controlled by an expansion valve and it is possible to operate more than one evaporator at a time.

U.S. Pat. No. 3,108,453 discloses a multiple evaporator refrigeration system in which the evaporators may be used independently of each other. Also a phase change material is used in connection with at least one of the evaporators.

U.S. Pat. No. 3,786,648 discloses the use of multiple evaporators for controlling the temperature in multiple compartments with the evaporators operating independently of each other.

U.S. Pat. No. 4,439,998 discloses a refrigeration apparatus having multiple evaporators with an electronically controlled valve system to deliver refrigerant to one evaporator in preference to the other, but causing the valve system to deliver refrigerant to the other evaporator after a predetermined amount of time.

U.S. Pat. No. 4,916,916 discloses the use of a phase change energy storage material in connection with a multiple evaporator refrigeration system.

Fuzzy logic controls are disclosed in U.S. Pat. Nos. 4,716,540 and 4,910,684.

SUMMARY OF THE INVENTION

The present invention provides a method for operating a refrigeration appliance with multiple evaporators in which the evaporator circuits operate sequentially in accordance with a fuzzy logic control system. In the preferred embodiments disclosed there are two evaporator circuits, one operating a freezer compartment and the other operating a fresh food compartment. The freezer compartment runs typically at 0-2 psig evaporating pressure until satisfied. The refrigerator section then runs typically at 18-22 psig evaporation pressure, at which pressure level, significant energy reductions are achieved.

A single compressor supplies the refrigerant through the condenser which serves to feed either the high or low pressure evaporators through known expansion devices such as capillary tubes, orifices, expansion valves, etc. Although various circuit options are disclosed, each employ some type of solenoid valve at the capillary tube inlet to determine which evaporator is fed.

In some devices in which the invention is used, a phase change material may be utilized with one or more of the evaporators in order to utilize a more efficient compressor and to reduce the overall energy consumption by the refrigeration appliance.

A fuzzy logic algorithm control is supplied for carrying out the method steps and for determining which evaporator is to be operated at any given time. The algorithm can be separated into two main functions, decision and timing. The decision function determines in which operational state the unit is to run. The timing function serves to switch on/off the electrical components in a specific time sequence per the given operational state. The decision portion of the algorithm utilizes fuzzy logic methodology.

The control algorithm for the dual evaporator refrigeration system must select the compressor's state: allocated to the fresh food compartment, allocated to the freezer compartment, or off. Instead of utilizing the classical, thermostat approach, where the compressor's state is a function of threshold temperatures assigned to each compartment, the fuzzy logic control selects the compressor's state so as to optimize the system's energy consumption and the system's environments (fresh food and freezer compartments).

DETAILED DESCRIPTION OF THE PREFERRED EMBODIMENTS

Figure 1:
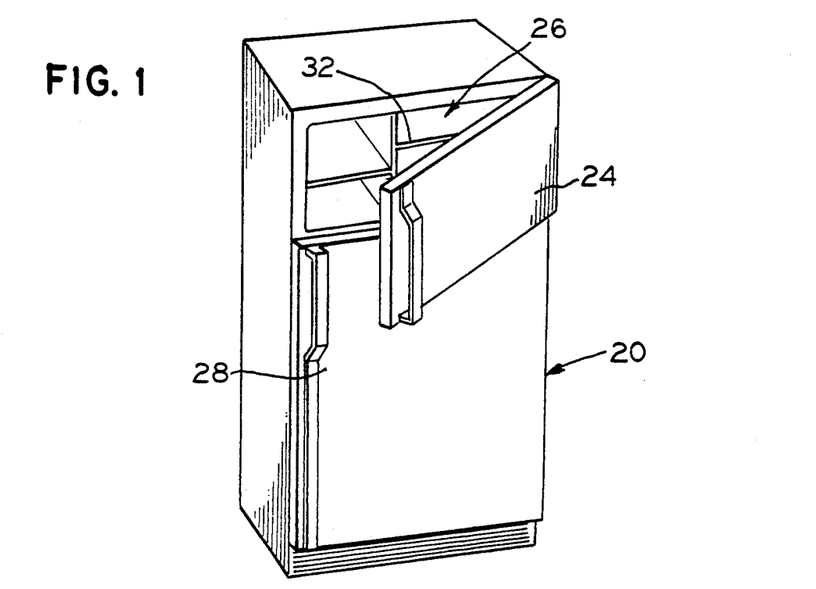
FIG. 1 is a perspective view of a refrigeration appliance in which the method embodying the principles of the present invention may be used.
Figure 2:
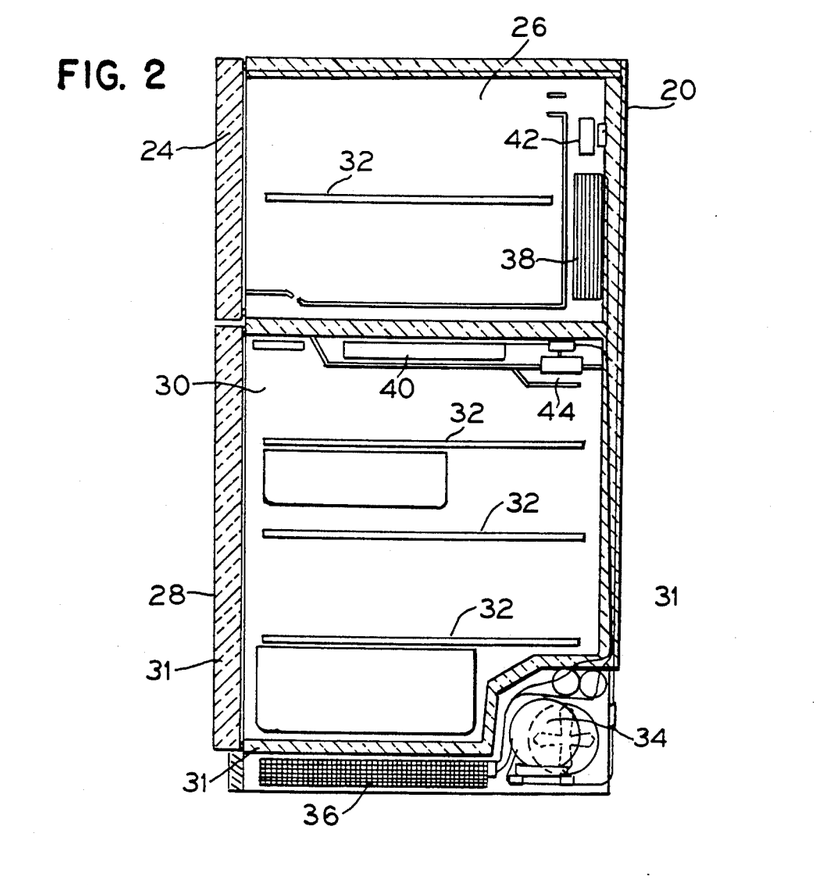
FIG. 2 is a side sectional view of the appliance of FIG. 1.

In FIGS. 1 and 2 there is shown generally a refrigeration appliance at 20 which comprises an exterior cabinet 22 having a first openable door 24 to expose a first interior compartment 26 and a second openable door 28 to expose a second interior compartment 30. Within each of the compartments 26, 30 there may be one or more shelves 32 for receiving food articles. Generally one of the compartments 26, 30 will be maintained at a temperature sufficiently below 0° C. to assure that all of the articles contained within that compartment will be maintained in a frozen state. The other compartment generally is maintained somewhat above 0° C. to maintain the items placed therein in a chilled, but not frozen condition.

In order to maintain the compartments at the desired temperature levels a refrigeration device is provided which comprises a compressor 34, a condenser 36, an evaporator 38 for the first compartment 26 and a second evaporator 40 for the second compartment 30. Appropriate air moving devices 42, 44 are provided for circulating air within each of the compartments past its respective evaporator to maintain a fairly consistent temperature throughout each compartment.

Figure 14:
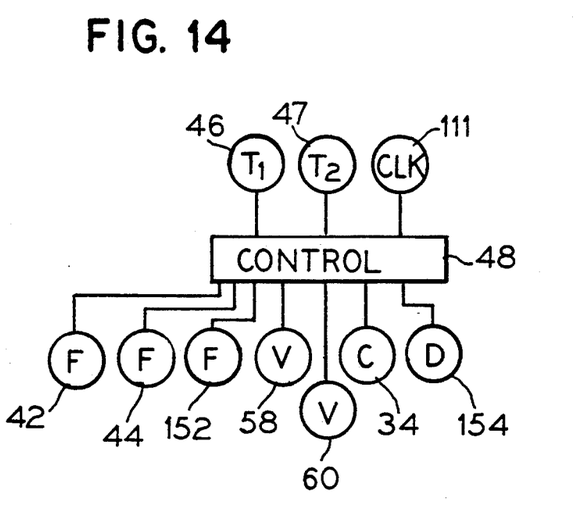
FIG. 14 is a schematic diagram of a control with its various inputs and outputs.

A temperature sensor 46, 47 is provided for each compartment 26, 30 to provide appropriate signal inputs to a control 48 (FIG. 14) for the appliance.

Although in carrying out the steps of the inventive method various types of refrigeration circuits can be utilized which have a plurality of evaporators, each operated sequentially and not concurrently, a number of specific exemplary refrigeration circuits are illustrated in detail in FIGS. 3 and 6 through 11.

Figure 3:
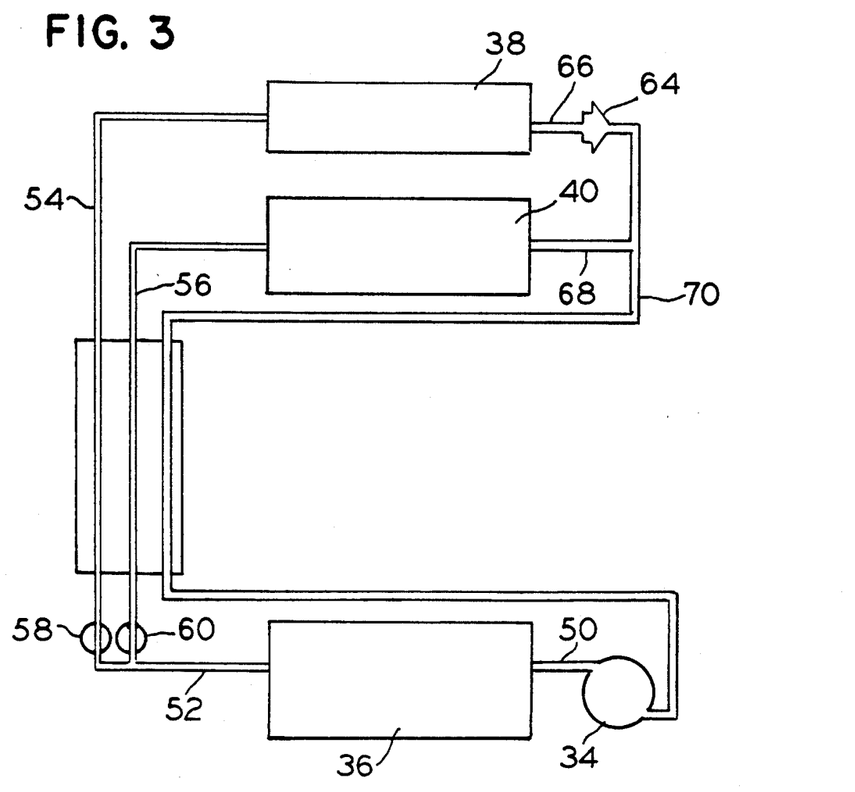
FIG. 3 is a first embodiment of a refrigeration circuit diagram.

In FIG. 3 a first embodiment of a refrigeration circuit is illustrated. In this embodiment the single compressor 34 supplies refrigerant through line 50 to the single condenser 36. Refrigerant then flows out of condenser on line 52 and is presented to parallel lines 54, 56 each of which are supplied with an individual latching type solenoid valve 58, 60. The solenoid valves 58 and 60 should preferably be the latching type which requires power for a brief moment (a fraction of a second) to change position from open to closed or vice versa. If the latching type valves are not used, then the valve 58 should be a normally closed type and the valve 60 should also preferably be a normally closed type but the normally open type can be used too. Lines 54 and 56 pass through a heat exchanger 62 towards evaporators 38 and 40 respectively. A check valve 64 is provided on suction line 66 which exits from evaporator 38. Suction line 68 which exits from evaporator 40 has no such valve. Lines 66 and 68 join in a return suction line 70 which also passes through the heat exchanger 62 on its return to the compressor 34.

Figure 4:
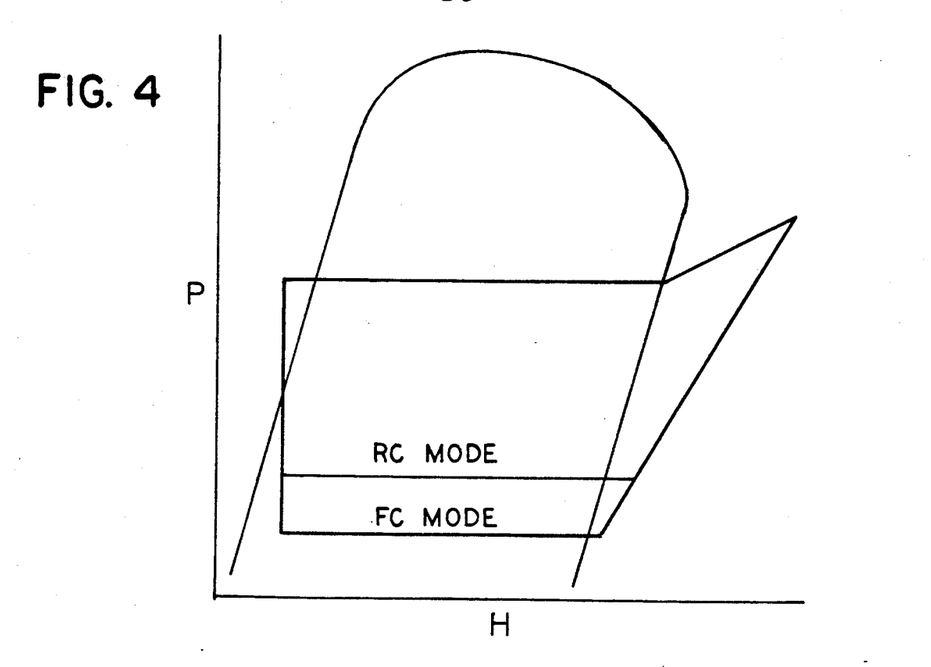
FIG. 4 is the representation of the refrigeration cycle on a pressure-enthalpy diagram.

FIG. 4 is the representation of the sequentially-operated two evaporator refrigeration system on a pressure-enthalpy diagram. As shown in FIG. 4, FC mode indicates the freezer mode of operation and the evaporation occurs at a lower suction pressure similar to the conventional refrigeration system. RC mode indicates the fresh food compartment cooling and the evaporation occurs at a higher suction pressure.

Figure 5:
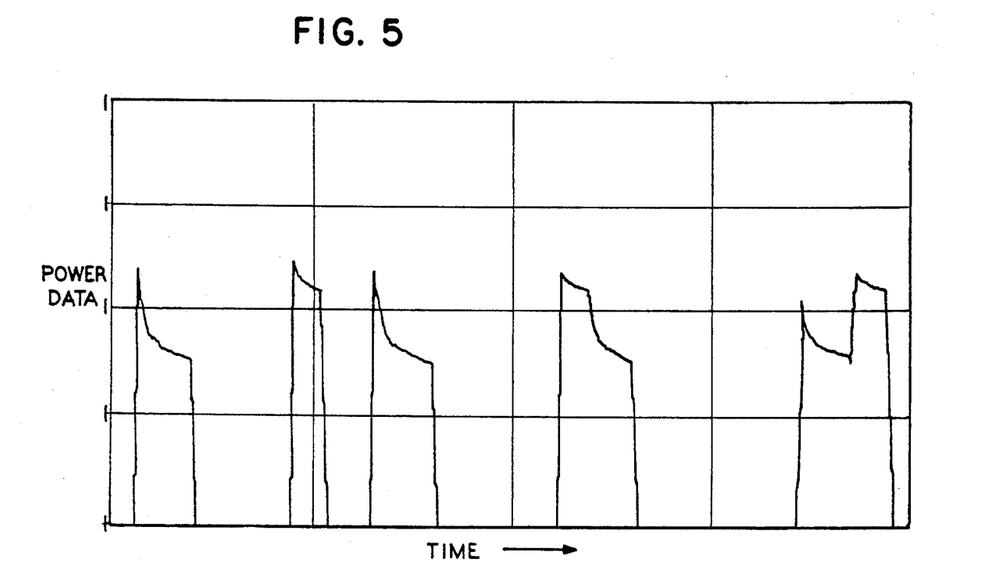
FIG. 5 is a typical representation of the compressor power usage against time with a sequentially-operated dual evaporator refrigerator.
Figure 6:
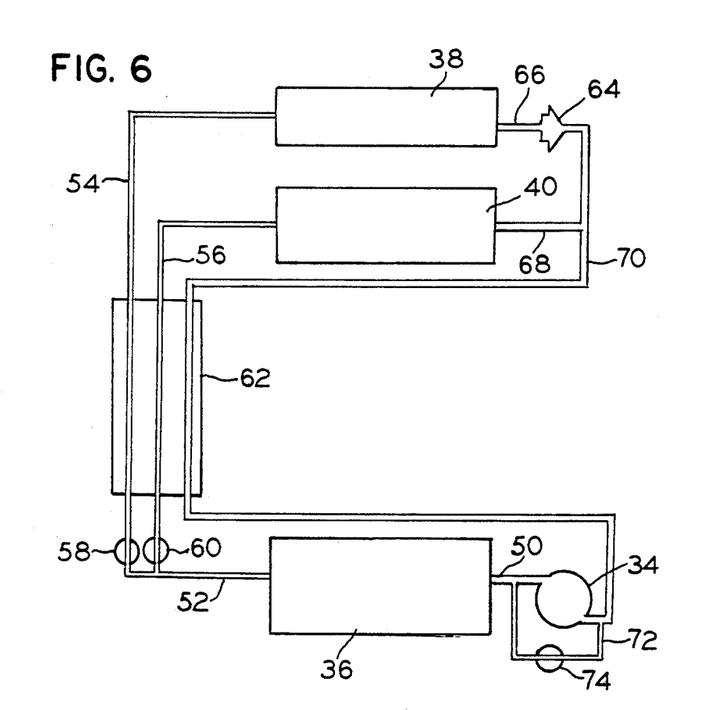
FIG. 6 is a second embodiment of a refrigeration circuit diagram.
Figure 7:
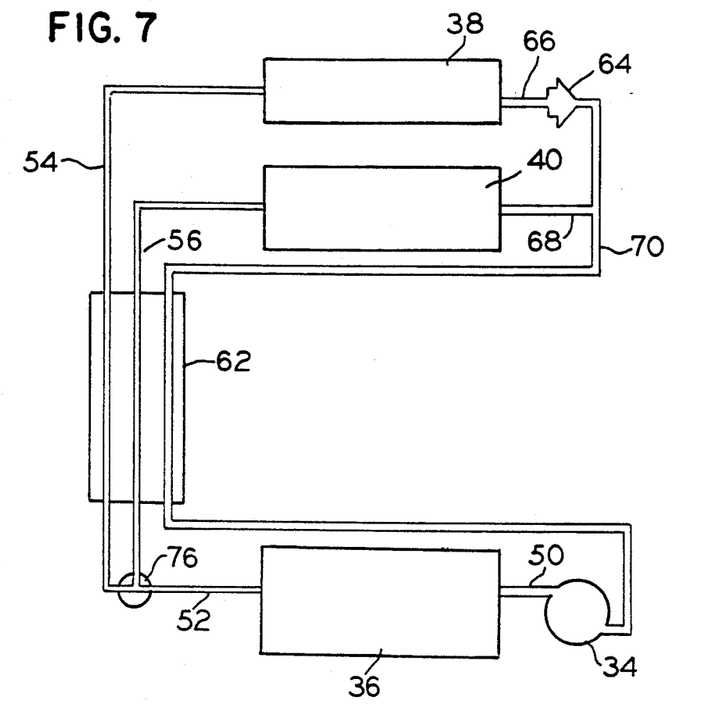
FIG. 7 is a third embodiment of a refrigeration circuit diagram.

FIG. 5 is the typical compressor power data (y-axis) vs time (x-axis) graph. As shown in FIG. 5, the fresh food cooling mode has the higher compressor power peaks and the freezer compressor operation has the lower compressor power peaks and there is no power consumption (off-cycle) in between the on-cycle modes of operation. As is apparent from the actual power data, at times the fresh food cooling mode and the freezer cooling mode follow each other in a sequential manner with no off-cycle in between and at other times they are separated with an off-cycle in between.

A second embodiment (FIG. 6) of the refrigeration cycle contains many of the same components which are identified with the same reference numerals as used in FIG. 3. The primary difference between the embodiment of FIG. 6 and that of FIG. 3 is that a bypass line 72 is provided around the compressor 34 which allows pressure equalization across the compressor through a solenoid valve 74 prior to its start-up.

Again, a third embodiment (FIG. 7) of the refrigeration cycle contains many of the same components which are identified with the same reference numerals as used in FIG. 3. The primary difference between the embodiment of FIG. 7 and that of FIG. 3 is that a three-position latching valve 76 is utilized at the junction of lines 52 and 56 which allows refrigerant to flow either through line 56 or line 54, but not both. The third position of the valve 76 is to close both lines 56 and 54.

Applicants have determined that it presently appears that the embodiment illustrated in FIG. has the highest potential for energy reduction during operation. Therefore, the various modes of operation of the two evaporators will be described with respect to that embodiment.

In this embodiment evaporator 38 is utilized in the freezer compartment 26 which is maintained at a below freezing temperature and thus the evaporator is operated at a lower pressure, generally in the range of 0-2 psig.

Evaporator 40 is utilized in the fresh food compartment and is normally maintained above freezing temperature and is operated at a higher pressure, generally in the range of 18-22 psig. With sufficient thermal insulation provided around the freezer compartment 26, the percentage run time in the freezer mode, that is, the mode in which refrigerant is supplied to evaporator 38, can be reduced significantly, such as to approximately 20-25% of the overall run time. The remaining run time is utilized in operating evaporator 40 for the fresh food compartment.

Since the evaporator 40 operates at a higher suction pressure, where the compressor 34 has a much higher cooling capacity, a lower capacity down-sized compressor could be used in such a system. Some slight to moderate downsizing of the compressor is possible and utilized with the invention. The compressor may be downsized 0 to 40% in cooling capacity with respect to a state of the art single evaporator, single compressor system embodied in a similar refrigerator cabinet. However, current compressor technology results in a degradation of efficiency of the compressor in smaller, lower capacity sizes when the compressor is downsized too far. This degradation is due to the mechanical and manufacturing limitations of smaller compressor mechanisms.

Therefore, Applicants have found that the compressor 34 similar in capacity to that of a comparable conventional single evaporator vapor compression system or somewhat down-sized in capacity (but still too large for the sequentially-operated dual evaporator system) can be used in disclosed embodiments with the excess cooling capacity being stored as thermal energy in a thermal storage or phase change material associated with evaporator 40 (and evaporator 38 if desired) such that the material will change phase either from a gas to a liquid or from a liquid to a solid during operation of evaporator 40. An example of this type of material could be a mixture of water (80 to 100%) and an organic material, such as propylene glycol (20 to 0%). This permits the compressor to be run less frequently, and excess compressor cooling capacity to be absorbed thus allowing it to run at higher suction pressures as desired, and relying on the phase change material to absorb heat energy during periods when the refrigerant is not being supplied through evaporator 40. Of course, the excess cooling capacity can also be handled by making the evaporator 40 larger with adequate fresh food compartment evaporator airflow, but the evaporator 40 would occupy more space thus taking more volume from the refrigerated space.

In order to provide a switch in between two distinct refrigeration circuits for sequential operation and to maintain proper charge distribution in the circuit, the current invention utilizes refrigerant valves 58 and 60 and a check valve 64. The refrigeration valves 58 and 60 can be of the kind which are operated by a solenoid but are not limited to that. In fact, the preferred embodiment illustrated in FIG. 3 utilizes two latching type solenoid valves for valves 58 and 60. The regular solenoid valves require electrical power (5 to 15 watts range) to their coils to remain open or closed (depends on whether they are normally closed or open type), therefore necessitating power consumption at least for a certain portion of their operation. Also, some of the power used by the valve coil gets transferred to the refrigerant in the form of heat. Both of these affect the overall refrigeration system energy efficiency to a small degree and reduce the energy savings expected from a sequentially-operated dual evaporator system. The latching solenoid valves (valves 58 and 60 in FIG. 3), on the other hand, require only a pulse (very brief, in terms of milliseconds) of electrical input to change position but requiring no other power input to remain open or closed.

The check valve 64 is unique to this invention and is vital for the proper refrigerant charge distribution during the sequential operation. Without it, the higher pressure refrigerant from evaporator 40 during the fresh food cooling mode would go to the lower pressure area in the colder freezer evaporator 38 and accumulate there. Since the refrigerant charge is determined based on only a single circuit, the refrigerant accumulation in evaporator 38 would cause the system to have less than the optimum refrigerant charge, thus starving the evaporator 40 during the fresh food cooling mode. The check valve 64 with the higher suction pressure on line 70 closes during the fresh food cooling mode, therefore preventing the refrigerant from accumulating in the evaporator 38. During the freezer cooling mode, the suction pressure on line 70 goes down and the check valve 64 opens up, thus allowing flow through the evaporator 38. Since the suction pressure on line 70 is lower than the pressure in the evaporator 40 during the freezer cooling mode, there is no need for such a check valve on the fresh food evaporator 40 outlet.

With respect to the modes of operation of the refrigeration circuit of FIG. 3, FIGS. 8-11 illustrate the various operation modes.

Figure 8:
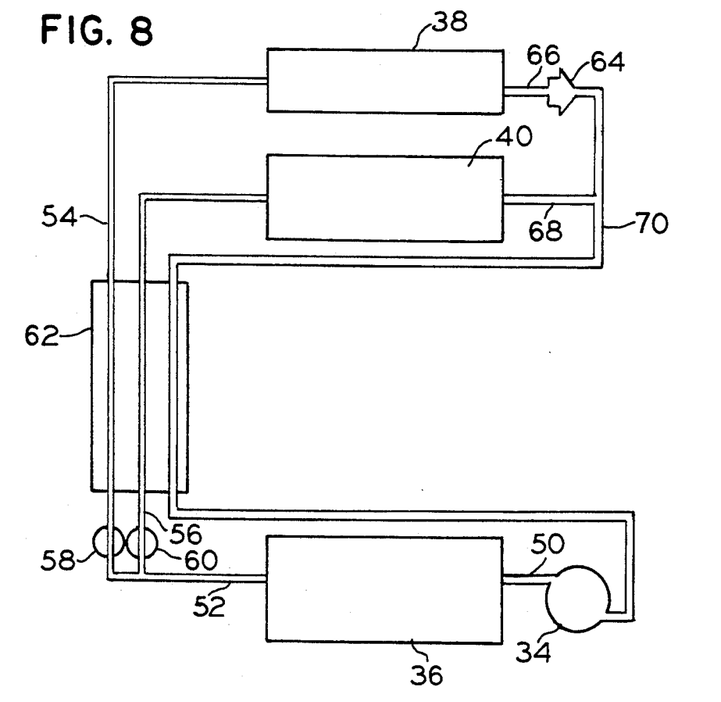
FIG. 8 is the first embodiment of the refrigeration circuit diagram shown in an off-cycle mode.

In FIG. 8 the off-cycle mode is illustrated. In that mode of operation, latching solenoid valve 60, joining lines 56 and 52, and latching solenoid valve 58, joining lines 54 and 52, are both closed for the major portion of the off-cycle. Check valve 64 on line 66 is also closed during the off-cycle mode and there is basically no refrigerant (some refrigerant vapor might be present) in lines 54, 56, 66 and 68 or in evaporators 38 and 40. The refrigerant therefore is present throughout a circuit which includes the compressor 34, line 50, condenser 36 and line 52. At the end of an off-cycle (when either compartment calls for cooling), the latching solenoid valve 60 is energized briefly to open, thus permitting refrigerant migration and pressure equalization through the fresh food circuit while the compressor 34 is still in an off condition (typically a 3 minute equalization time is required).

Figure 9:
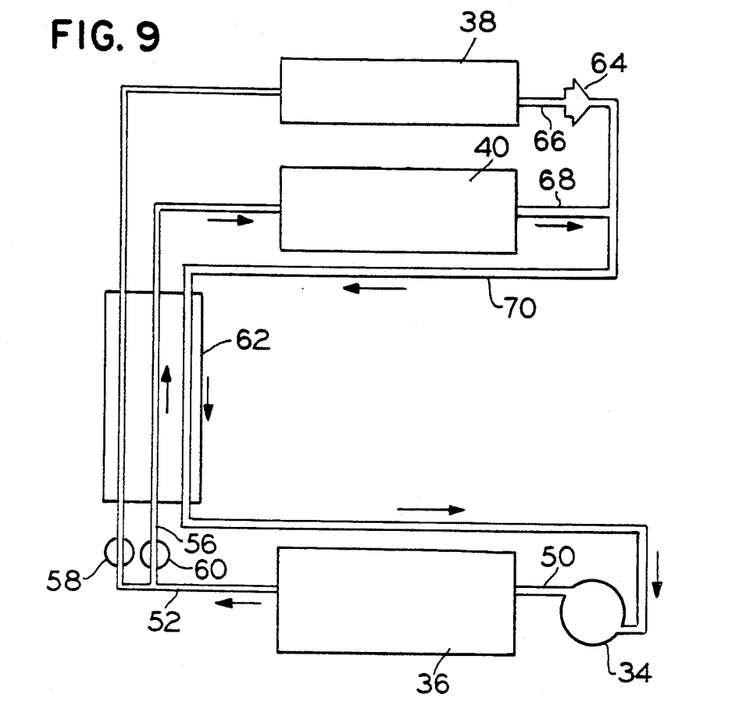
FIG. 9 is the first embodiment of the refrigeration circuit diagram as shown in a fresh food cooling mode.

FIG. 9 illustrates operation of the system in a fresh food cooling mode. The pressure equalization (not needed if this cycle comes just after the freezer mode of operation) and the subsequent fresh food cooling mode are initiated and the fresh food cooling mode is terminated in response to an appropriate control signal representing a temperature condition of the fresh food compartment 30, time dependent signal or other control. In this mode, the latching solenoid valve 60 is now open (just after the pressure equalization) and remains non-energized and thus in the same condition as described at the end of an off-cycle. If this mode follows the freezer cooling mode, then the latching solenoid valve 58 is briefly energized to close and the latching solenoid valve 60 is briefly energized to open. Also, check valve 64 is normally closed and the latching solenoid valve 58 is closed (same as in the off-cycle mode shown in FIG. 8).

The major difference in FIG. 9 is that the compressor 34 is on and thus refrigerant is being pumped through the circuit in the direction of the arrows. Thus, refrigerant flowing from the condenser 36 flows through lines 52 and 56 through the heat exchanger 62 and into evaporator 40 where heat is absorbed from the air circulating over the evaporator 40 in refrigerator compartment 30 as well as absorbed from the phase change material (if used) associated with evaporator 40. The refrigerant then flows through suction lines 68 and 70, back through the heat exchanger 62 to return to the compressor 34.

Figure 10:
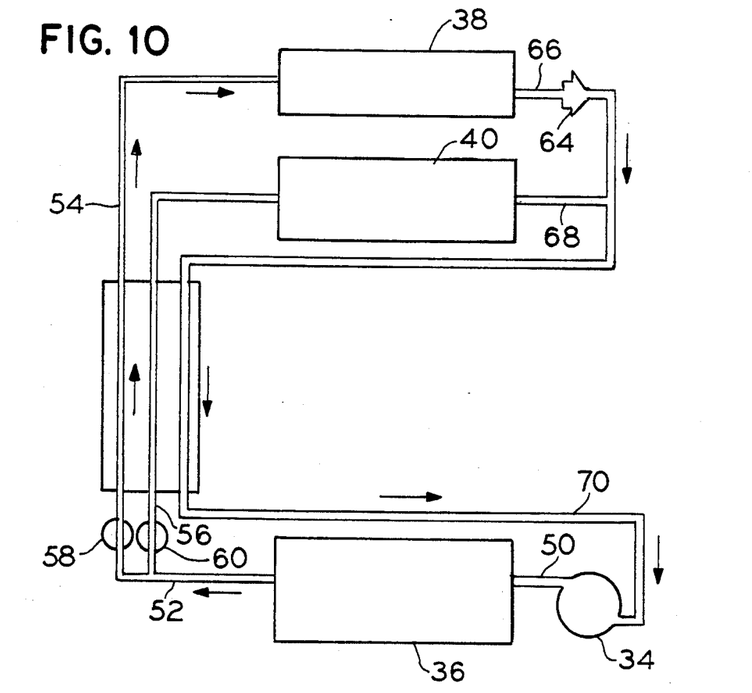
FIG. 10 is the first embodiment of the refrigeration circuit diagram shown in a freezer cooling mode.

FIG. 10 illustrates the operation of the circuit with the evaporator 38 in operation, that is, the freezer cooling mode. This mode is also initiated and terminated in response to an appropriate control signal representing a temperature condition of the freezer compartment 26, a time dependent signal or other control signal. If freezer cooling mode is initiated after an off-cycle, the latching solenoid valve 60 is open during the pressure equalization period to allow pressure equalization over the fresh food compartment cooling circuit. Once the pressure equalization is complete or if the freezer cooling mode starts after a fresh food cooling cycle, the latching solenoid valve 60 is briefly energized to close and the latching solenoid valve 58 is briefly energized to open (to start the freezer cooling) so that line 52 is opened to line 54 and closed to line 56. Check valve 64 will be open due to a flow of refrigerant into it from evaporator 38.

In this mode of operation, the compressor is required to provide a much lower pressure on suction line 70. In this mode refrigerant is supplied from the compressor 34 through line 50, condenser 36, line 52, and line 54 to the evaporator 38 and then out line 66 through valve 64 to line 70 to return to the compressor. Any refrigerant remaining in line 56 and evaporator 40 will be at a higher pressure and thus there will not be any migration of refrigerant from line 66 into line 68 and evaporator 40. With valve 60 closing the connection between line 52 and line 56, line 68 will represents a high pressure dead end line, thus blocking any flow of refrigerant into line 68 from line 66.

Figure 11:
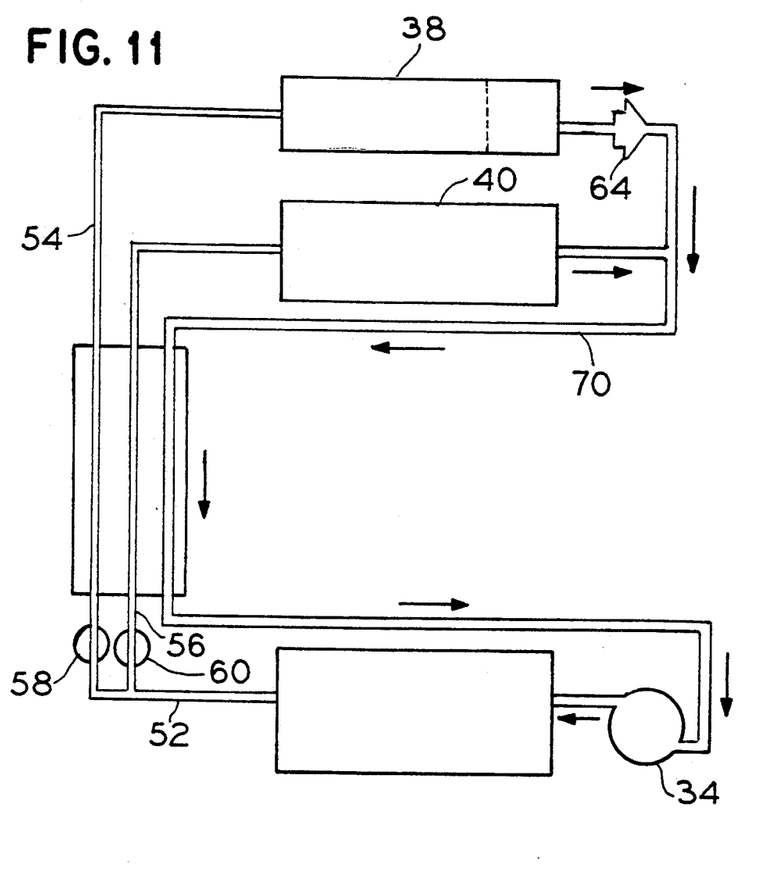
FIG. 11 is the first embodiment of the refrigeration circuit diagram shown in a freezer evaporator pump-out mode.

FIG. 11 discloses a pump-out mode during which time refrigerant is pumped out of the evaporator 38 at the end of the freezer cooling mode. In this mode of operation the latching solenoid valve 60 remains closed thus keeping a closed path between line 52 and line 56 leading to high pressure evaporator 40. The latching solenoid valve 58, however, is also briefly energized or electrically pulsed and thus moved to a closed position thus preventing flow of refrigerant from line 52 to line 54. Check valve 64 is opened due to the low pressure in line 70.

In this mode of operation the compressor 34 runs to provide the low pressure suction on line 70. This low pressure suction causes refrigerant to be evacuated both from evaporator 38 and evaporator 40. This step is undertaken to assure that sufficient refrigerant will be available for efficient operation of evaporator 40 in the mode shown in FIG. 9. Since the refrigeration circuit only has sufficient refrigerant for the evaporator 38 circuit or the evaporator 40 circuit alone, the refrigerant charge distribution is critical and it is absolutely necessary that the refrigerant does not get trapped in evaporator 38 during the fresh food mode operation, thus requiring the pump-out mode illustrated in FIG. 11 at the end of the freezer cooling mode illustrated in FIG. 10.

Following completion of the pump out mode of FIG. 11, which can occur for a predetermined time period or in response to a sensed condition, the compressor 34 is first turned off, the valves 58 and 60 remain closed if an off-cycle mode of operation is to follow. With the compressor 34 turned off and the valves 58 and 60 closed, check valve 64 will close due to low pressure in evaporator 38 and relatively higher pressure in line 70, thus resulting in the condition shown in FIG. 8 as the off-cycle mode. At the end of the off-cycle mode, refrigerant will be allowed to migrate through line 56 and evaporator 40 to equalize pressure across the compressor thereby permitting an easier start condition for the compressor. If a fresh food mode operation is to follow the pump-out mode, then the compressor 34 will remain on, the valve 58 will close and the valve 60 will open at the end of the pump-out mode.

Figure 12:
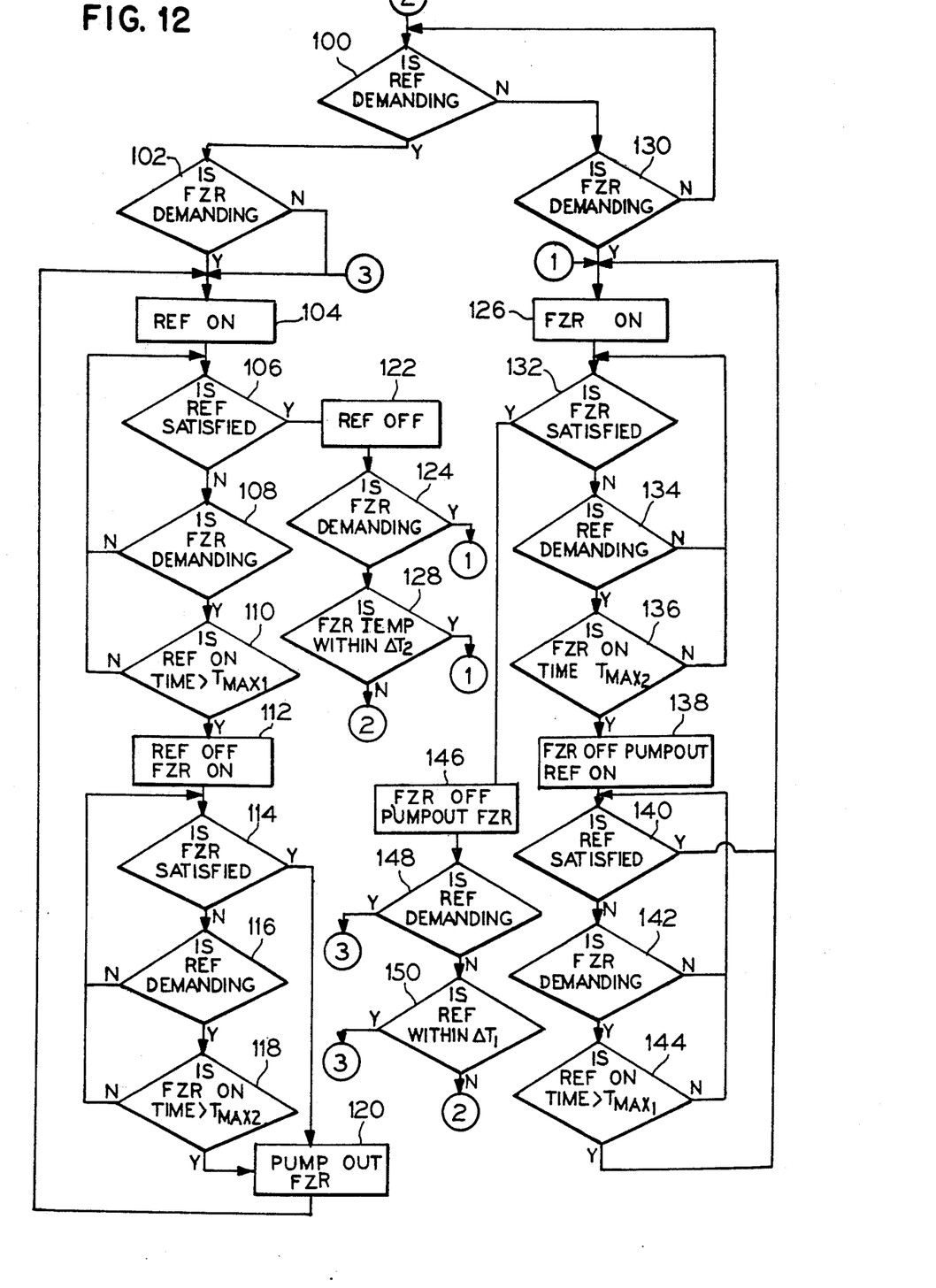
FIG. 12 is a flow chart diagram illustrating the control sequences for the multiple evaporators.
Figure 15:
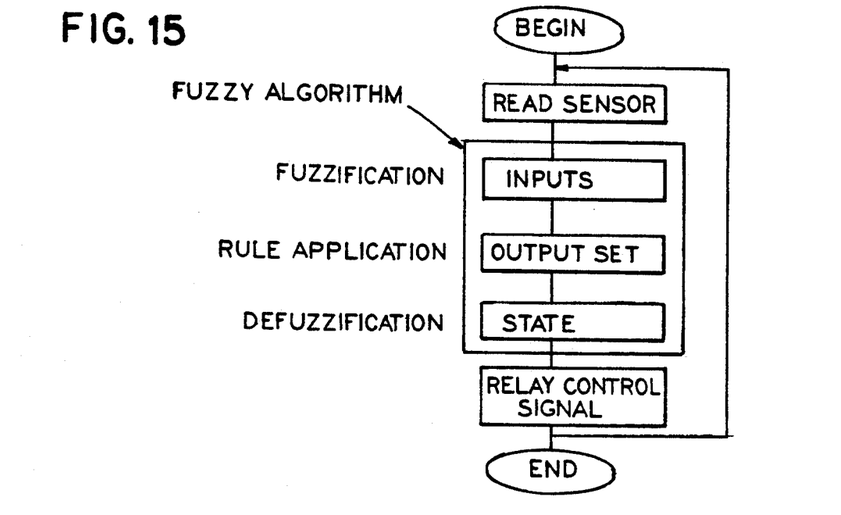
FIG. 15 is a simplified dual evaporator refrigeration system control algorithm flow chart utilizing fuzzy logic.
Figure 16:
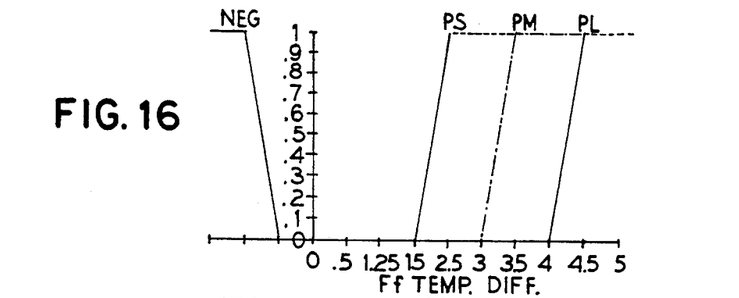
FIG. 16 illustrates the membership function for the fresh food temperature difference.
Figure 17:
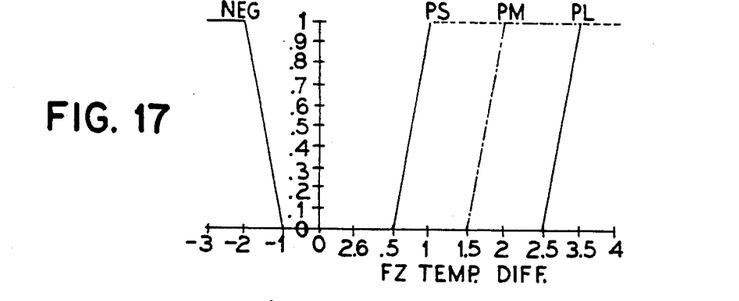
FIG. 17 illustrates the membership function for the freezer temperature difference.
Figure 18:
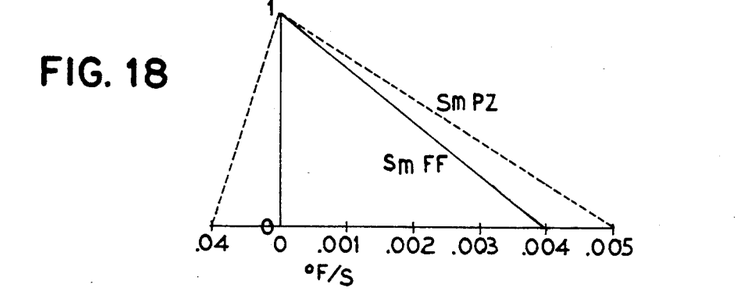
FIG. 18 shows the membership function for the temperature-time gradients.

With any of the above embodiments the control 48 is designed to provide a particular series of steps for operating the two evaporators sequentially to assure the necessary cooling requirements are met. In FIG. 12 there is illustrated a sample flow chart illustrating a method of control embodying the principles of the present invention. For each of the diamond shaped decision boxes, the algorithm has three stages, fuzzification, rule application and defuzzification (FIG. 15). During the fuzzification stage, the system's inputs are manipulated and mapped to linguistic values. The system's parameters used are: fresh food temperature, freezer temperature, phase-change material (PCM) temperature and cycle length. These values are manipulated to derive the algorithm's inputs. These are: fresh food and freezer temperature differences from set point temperatures, fresh food and freezer temperature-time gradients, pcm temperature and cycle length. Using fuzzy logic methodology, these inputs are mapped to the linguistic values described in FIGS. 16-19. The membership functions, shown in FIGS. 16-19, do not have the traditional trapezoidal or triangular shapes associated with fuzzy membership functions (see FIG. 20). They are defined in this manner to simplify the antecedent clauses in the fuzzy rule base. For example, if the membership functions are defined in the traditional manner, rule 8 in FIG. 21 would read: if FfDiff is (PM or PL) then Ff. The membership function defining "PM" and "PL" in the above rule are shown in FIG. 20.

Based on the compressor's current state, three to seven rules are applied to the input set defined by "fuzzification" to derive an output set. As previously described, the compressor has three states, allocated to the fresh food compartment, allocated to the freezer compartment, and off, that are designated by the labels Ff, Fz and Off, respectively. The rules applied in each case are listed in FIG. 21. The rules define four consequents: OffValue, FfValue, FzValue and PCMValue. The degree of the consequent equals the degree of the antecedent. Furthermore, rules 0a-0c, 1a, 3a-3c and 4a are dependent are rules 0, 1, 3 and 4 respectively. This means that if the degrees of the antecedent clauses in rules 0, 1, 3 or 4 are zero, their dependent rules are fired to degree zero, regardless of the degrees of the antecedent clauses in the dependent rules. "Dependents" is defined as meaning that if the antecedent clause of an independent rule is inactive (or equivalently active to degree zero), the dependent rule (S) is also inactive, irrespective of the degrees to which the antecedent clauses of the dependent rules are active. For example, in the antecedent of rule 0, the degree to which the fresh food temperature difference is negative (as defined by FIG. 16) is tested. If "FfDiff" is "neg" to degree zero, rule 0 is inactive. Because rule 0 is inactive, rule 0a, 0b and 0c, which depend on rule 0, are also inactive although the conditions in the refrigerator may be such that the antecedent clauses of rule 0a, 0b or 0c are non-zero. Structuring the rule base in this manner simplifies the rule base and its implementation because the rules' antecedent clauses are singular and functions evaluating rules with multiple antecedents are not necessary. For example, if 0b is not dependent on rule 0, to ensure proper execution, the rule would read:

if FfDiff is Neg & FzDiff is Sm then Fz. This would require making a function evaluating the fuzzy conjunction necessary. Finally, the rule base only applies to situations where the compressor's state may change. In cases where changing states is known to be undesirable, the rule base does not apply; resulting in all consequent values equalling zero. These situations are limiting cases and are handled by the defuzzifying strategy. Defining the rule base in this manner, decreases its size because rules governing the limiting cases are eliminated.

In the defuzzification stage, the output set is manipulated to determine the compressor's next state. Initially, if PCMValue is non-zero and the phase-change material is available, i.e., the material's temperature is below some threshold, then FfValue is cleared. At this point, the compressor's next state equals the maximum of OffValue, FfValue and FzValue, i.e., if OffValue is greater than both FfValue and FzValue, then the compressor's next state is "off". If no dominant value exists, the compressor's next state is a function of the current state. If the three values are equal or if the current state's value equals only one of the other values—both of those exceeding the third value—the compressor's state is unchanged, i.e., if the current state is "allocated to the freezer," and FzValue is not less than either FfValue or OffValue, then the next state is "allocated to the freezer." If the current state's value is less than the other two values, which are equal, the next state is selected by the following rules. If the current state is off, the next state is "allocated to the fresh food compartment." If the current state is "on," i.e., "allocated to either the fresh food or freezer compartments," the next state is "allocated to the other compartment."

Three sample cases are described below to demonstrate the algorithm.

| Case 1: | | | |
|---|---|---|---|
| Initial Conditions: | | | |
| Compressor State: | Off | Cycle Length: | 10 mns |
| Ff Diff: | 2.0 F | Fz Diff: | 1.75 F |
| Ff Grad: | 0.001 F/s | Fz Grad: | 0.003 F/S |
| PCM: | Available | | |
| Fuzzification: | | | |
| Fresh Food Temperature Difference: | | (see FIG. 16) | |
| PS (2.0) = 0.5 | | | |
| PM (2.0) = 0.0 | | | |
| Freezer Temperature Difference: | | (see FIG. 17) | |
| PM (1.75) = 0.5 | | | |
| Rules Fired: 7 & 8 | | (see FIG. 21) | |
| Rule Application: | | | |
| OffVAlue = 0.0 | | (= 0.0 when state = off) | |
| FfValue = degree_Rule_6 = PM (2.0) = 0.0 | | | |
| FzValue = degree_Rule_7 = PM (1.75) = 0.5 | | | |
| PCMValue = − degree_Rule_8 = PS (2.0) = 0.5 | | | |
| Defuzzification: | | | |
| Since PCMValue > 0 and PCM is Available then FfValue = 0.0 and Ff Fan is On | | | |
| Compressor State = max (OffValue, FfValue, FzValue) = FzValue | | | |
| Therefore, Compressor State = Fz and Ff Fan is On (using PCM) | | | |

Figure 21:
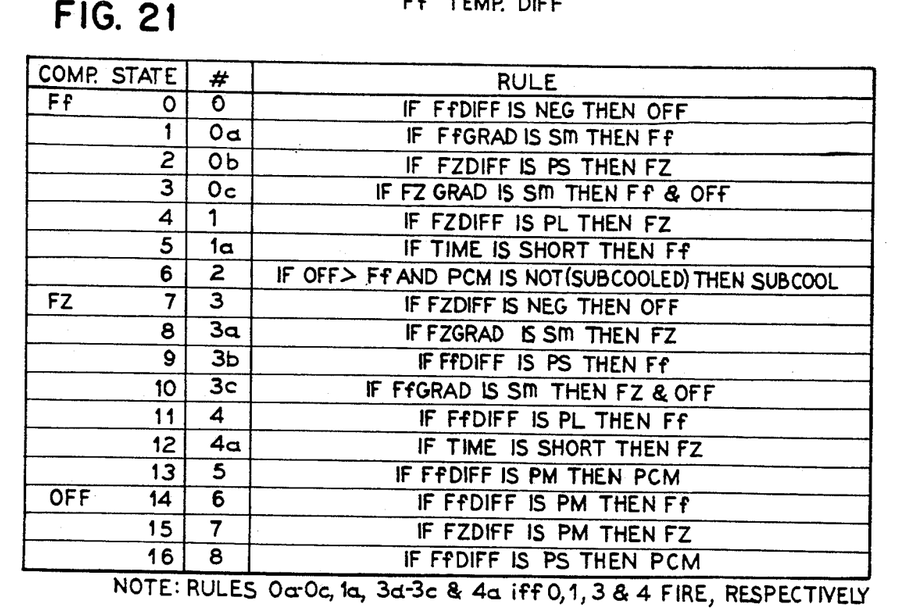
FIG. 21 illustrates the fuzzy logic rule base.

In this case, first note that since the compressor is off, only rules 6, 7 and 8 are available. As indicated in FIG. 21, the rule base depends on the current state of the compressor. When the compressor is allocated to the fresh food compartment, the rule base includes rules 0, 0a, 0b, 0c, 1, 1a and 2. When the compressor is allocated to the freezer compartment, the rule base includes rules 3, 3a, 3b, 3c, 4, 4a and 5. To determine the degree to which each rule is active, the degree to which each rule's antecedent clause is active must be determined. Using the antecedent clauses of rules 6, 7 and 8, the degrees to which the "FfDiff" is "PM" and "PS" and to which the "FzDiff" is "PM" are active must be determined using the initial conditions and the membership functions defined in FIGS. 16 and 17. The degrees are set forth in the fuzzification section.

In all cases, the degree to which a rule is active equals the degree to which its antecedent clause is active. Therefore, after applying these rules (Rules 6, 7 and 8), "OffValue" equals 0 (no active rules "OffValue" in the antecedent clause); "FfValue" equals 0; "FzValue" equals 0.5 and "PCMValue" equals 0.5. Applying the defuzzification rules, because the fresh food compartment needs cooling and cooling energy is stored in the phase-change material, which is available, the fresh food fan is activated and "FfValue" is set to 0 (this prevents the compressor from being allocated to the fresh food compartment when the compressor is currently off and cooling energy is stored in the phase-change material). To determine the new compressor state, the compressor is allocated to that state which has the highest demand, demand being represented by "OffValue", "FfValue" and "FzValue". Since only "FzValue" is greater than 0, the compressor is allocated to the freezer.

| Case 2: | | | |
|---|---|---|---|
| Initial Conditions: | | | |
| Compressor State: | Fz | Cycle Length: | 15 mns |
| Ff Diff: | 4.375 F | Fz Diff: | 1.0 F |
| Ff Grad: | 0.0025 F/s | Fz Grad: | −0.02 F/s |
| PCM: | Not Available | | |
| Fuzzification: | | | |
| Fresh Food Temperature Gradient: | | (see FIG. 18) | |
| Sm (0.0025) = 0.375 | | | |
| Fresh Food Temperature Difference: | | (see FIG. 16) | |
| PS (4.375) = 1.0 | | | |
| PM (4.375) = 1.0 | | | |
| PL (4.375) = 0.75 | | | |
| Freezer Temperature Gradient: | | (see FIG. 18) | |
| Sm (−0.02) = 0.5 | | | |
| Freezer Temperature Difference: | | (see FIG. 17) | |
| Neg (1.0) = 0.0 | | | |
| Cycle Length: | | (see FIG. 19) | |
| FzShrt (15) = 0.83 | | | |
| Rules Fired: 4, 4a & 5 | | (see FIG. 21) | |
| Rule Application: | | | |
| OffValue = degree_Rule_3 + degree_Rule_3c = Neg(1.0) + 0.0 = 0.0 | | | (3c does not fire because 3 is not fired) |
| FfValue = degree_Rule_3b + degree_Rule_4 = 0.0 + 0.0 + PL (4.375) = 0.0 + 0.0 + 0.75 = 0.75 | | | (3b does not fire because 3 is not fired) |
| FzValue = degree_Rule_3a + degree_Rule_3c + degree_Rule_4a = 0.0 + 0.0 + FzShrt(15) = 0.0 + 0.0 + 0.83 = 0.83 | | | (3a,c does not fire because 3 is not fired. 4a fires because 4 fires) |
| PCMValue = degree_Rule_5 = PM (4.375) = 1.0 | | | |
| Defuzzification: | | | |
| Since PCMValue > 0 and PCM is Not Available then FfValue = 0.75 | | | |
| Compressor State = max (OffValue, FfValue, FzValue) = Fz Value | | | |
| Therefore, Compressor State = Fz | | | |

Because in this case the compressor is allocated to the freezer compartment, the rule base includes rules 3, 3a, 3b, 3c, 4, 4a and 5. It is necessary to determine which, if any, of these rules are active and to what degree (this defines the outputs set). Because rule activation is based on antecedent clause activation (and independent rule activation for dependent rules), to determine the degree of activation of rule 3, the degree to which "FzDiff" is "neg" must be determined. In this case, it is active to degree zero since the freezer temperature differential is positive. Therefore, rule 3 is inactive which implies rules 3a, 3b, 3c are inactive also.

Case 3:

Initial Condition:

| Compressor State: | Ff | Cycle Length: | 7 mns |
|---|---|---|---|
| Ff Diff: | −1.2 F | Fz Diff: | 0.3 F |
| Ff Grad: | −0.03 F/s | Fz Grad: | 0.001 F/s |
| PCM: | Not Subcooled | | |

Fuzzification:

| | |
|---|---|
| Fresh Food Temperature Gradient: | (see FIG. 18) |
| Sm (0.03) = 0.25 | |
| Fresh Food Temperature Difference: | (see FIG. 16) |
| Neg (−1.2) = 0.4 | |
| Freezer Temperature Gradient: | (see FIG. 18) |
| Sm (0.001) = 0.8 | |
| Freezer Temperature Difference: | (see FIG. 17) |
| PS (0.3) = 0.0 | |
| PM (0.3) = 0.0 | |
| PL (0.3) = 0.0 | |
| Cycle Length: | (see FIG. 19) |
| FfShrt (7) = 1.0 | |
| Rules Fired: 0, 0a, 0c & 2 | (see FIG. 21) |

Rule Application:

| | |
|---|---|
| OffValue = degree-Rule-0 + degree-Rule-0c = 0.4 + 0.8 = 1.2 | (0c fires because 0 fires) |
| FfValue = degree__Rule__0A + degree__Rule__0c + degree-Rule 1a = 0.025 + 0.8 + 0.0 = 1.05 | (0a, c fire because 0 fires. 1a does not fire because 1 does not fire) |
| FzValue = degree__Rule__1 = PL (0.3) = 0.0 | |
| PCMValue = 0.0 | (= 0.0 when state = Ff) |

Defuzzification:

Since OffValue > Ff Value and PCM is Not Subcooled (Rule 2) then OffValue = 0.0 and Ff Fan is Off
Compressor State = max (OffValue, FfValue, FzValue) = FfValue
Therefore, Compressor State = Ff and Ff Fan is Off (subcooling PCM)

When the compressor is allocated to the fresh food compartment, it is advantageous from an energy standpoint to subcool the phase-change material if it is not already subcooled, rather than to shut down the compressor. Therefore, if the phase-change material is not subcooled, "PCMValue" should equal 0.

In step 100 of FIG. 12 there is a determination of whether the fresh food compartment 30 is demanding cooling. This occurs in accordance with the rules set forth in FIG. 21 and described above. Steps 102 and 130 are also accomplished in accordance with such rules. If the fresh food compartment is demanding cooling, and it is determined that compressor state=Ff, control passes to the left side of the flow chart. Inquiry is then made in step 106 as to whether the fresh food compartment cooling demand is satisfied.

If the fresh food compartment cooling demand is not yet satisfied, control passes to step 108 to determine whether the freezer compartment is demanding cooling. If the freezer compartment is not demanding cooling (in accordance with the rules of FIG. 21) then control is passed back to step 106 to repeat steps 106 and 108 as set forth above.

If, in step 108 it is determined that the freezer compartment is demanding cooling, then control passes to step 110 where an inquiry is made to determine how long the fresh food compartment evaporator 40 has been running based on input from clock 111. If Time is short in accordance with FIG. 19 and in accordance with the rules of FIG. 21, control may be passed back to step 106 for a repetition of the above steps.

Figure 19:
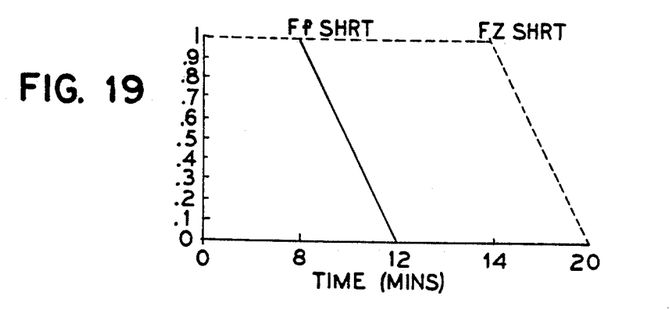
FIG. 19 illustrates the membership function for the cycle length.
Figure 20:
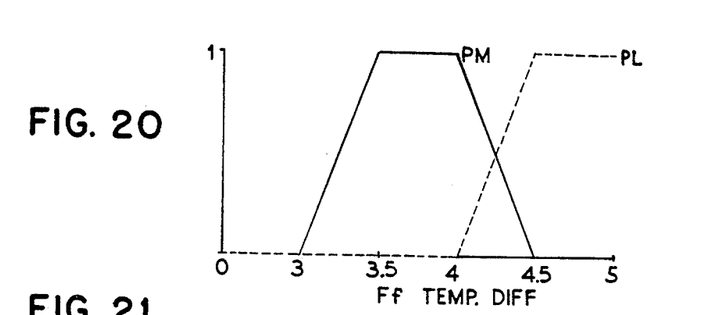
FIG. 20 illustrates traditional membership definitions.

However, if Ff Time is not short (i.e., greater than 12 minutes in accordance with the membership requirements of FIG. 19) then, in accordance with the rules, control passes to control unit 112 wherein the appropriate valves are operated such that the fresh food compartment evaporator 40 is turned off and the freezer evaporator 38 is turned on to begin a cooling of the freezer compartment 26 (since the conditions in the freezer require this). This will occur even though the fresh food compartment 30 has not yet reached a temperature level to satisfy the fresh food compartment temperature sensor (lower limit temperature).

Control then passes to step 114 where it is inquired whether the freezer cooling demand is satisfied. If it is still demanding cooling, control passes to step 116 to determine whether the fresh food compartment is demanding cooling. Since it is quite likely that the fresh food compartment will be demanding cooling in this scenario, control is passed to step 118 where an inquiry is made to determine whether the freezer time is short in accordance with FIG. 19. Control will continue to cycle through this loop until the rules, based on temperature differences and gradients, and cycle time, require that the state of the compressor be returned to Ff on. Upon the occurrence of this event, control passes to step 120 wherein the refrigerant is pumped out of the freezer evaporator 38, as described above, and then control passes back to step 104 to turn the fresh food compartment evaporator 40 on by appropriate operation of the various valves.

If, in step 106 it is determined that the fresh food compartment temperature sensor 46 is satisfied, then control passes to step 122 to initiate termination of the use of the fresh food compartment evaporator 40. Before the compressor is turned off, however, control passes to step 124 where it is inquired whether the rules dictate that the state of the compressor be changed to FZ. If so, then control passes to step 126 to begin operation of the freezer evaporator 38.

If the response to the inquiry in step 100 is negative, control is passed to step 130 to determine whether the freezer compartment is demanding cooling. If it is not, control passes back to step 100 again to essentially wait in the off mode until one of the compartments demands cooling.

If the freezer compartment demands cooling in step 130, then control is passed to step 126 where the freezer evaporator 38 is turned on by the control 48 by appropriate controlling of the valves and compressor 34. Control then passes to step 132 where inquiry is made to determine whether the freezer cooling demand is satisfied.

If the freezer cooling demand is not yet satisfied (according to the rules of FIG. 21), then control passes to step 134 to determine whether the fresh food compartment is demanding cooling. If it is not, then control passes back to step 132 to repeat the loop. If the fresh food compartment is demanding cooling (in accordance with the rules), then control passes to step 136 to determine, using a current cycle time value, how long the freezer evaporator 38 has been operating in order to apply rules 1a and 4a as necessary. Under the rules outcome, control may pass back to step 132 to again repeat the loop.

If the rules determine that the compressor state should change to Ff, then control passes to step 138, during which step the freezer evaporator 38 is turned off by appropriate control of the various valves, refrigerant is pumped out of the freezer evaporator and the fresh food compartment evaporator 40 is turned on through appropriate control of the valves. Control then passes to step 140 to determine whether the fresh food compartment cooling demand is satisfied.

If it is not yet satisfied (according to the rules), control passes to control step 142 to determine whether the freezer compartment is demanding cooling. If it is, then control passes to control step 144 to determine the length of time the fresh food compartment evaporator 40 has been on. The longer the fresh food compartment evaporator 40 has been running, the more likely it is that control will pass back to control step 126 to again initiate freezer cooling. This also occurs if the fresh food compartment cooling demand is deemed satisfied (Ff diff becomes sufficiently close to zero) in step 140.

If the freezer cooling demand, in step 132, is determined to be satisfied, then control passes to step 146 wherein the freezer evaporator 38 is turned off and refrigerant is pumped out of the freezer evaporator. Before the compressor 34 is turned off, control is passed to step 148 to determine whether the fresh food compartment is demanding cooling. If it is (according to the rules), then control is passed to step 104 to repeat the above-described steps.

During the operation of the compressor 34 and condenser 36, various fans 42, 44 are operated by the control to cause air flow over one or both evaporators, as desired for cooling purposes and also a fan 152 is operated to cool the condenser. During the fresh food compartment cooling mode of operation, the amount of heat rejected by the condenser 36 increases substantially due to the higher suction pressure (thus higher cooling capacity operation). If nothing is done (that is, to effect the size of the condenser or the fan flow rate for the condenser), then the temperature difference between the condenser 36 and the sink temperature (ambient temperature) increases. This causes higher head pressures and lower compressor performance levels than otherwise possible. To reduce the temperature difference between the condenser and ambient temperature, the control may operate the condenser fan at different speeds. Thus, a higher speed and thus higher air flow fan operation for the condenser can be used when the fresh food compartment evaporator is being operated.

Another improvement in efficiency of the system relates to the defrost cycle. In presently, commercially available refrigerators, the evaporator which provides cooling below 0° centigrade goes through a defrost period cycle usually based upon compressor run time. Usually when the preselected amount of time for the running of the compressor has occurred, the compressor is taken off-line through a cam switch and a defrost heater 154 is energized. Thus, any cooling done in the freezer compartment is stopped and must then be overcome by the defrost heater.

Figure 13:
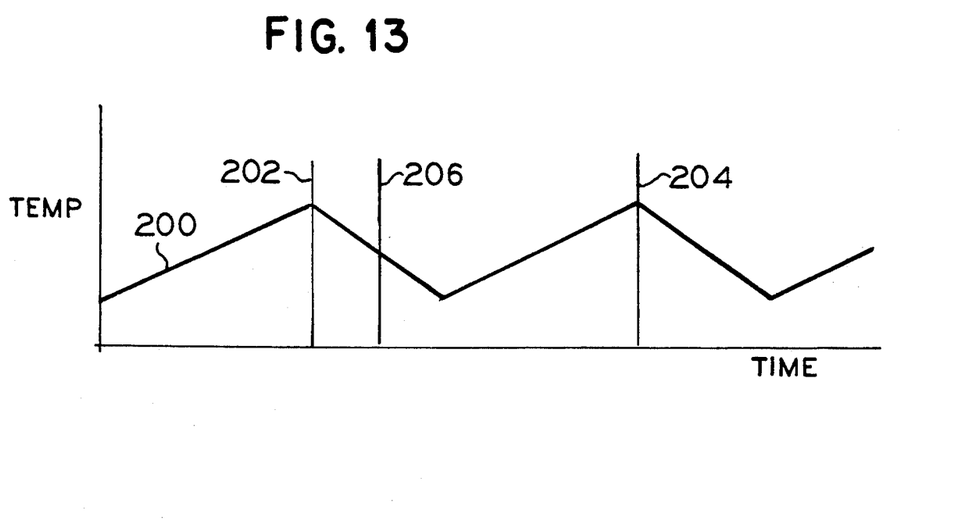
FIG. 13 is a schematic graphical illustration of time versus temperature Within the freezer compartment and how it relates to the defrost initiation cycle.

An improved cycle is illustrated schematically in FIG. 13. In that graph, there is a curve 200 shown schematically as a linear saw tooth curve, although in reality the segments of that curve would most likely not be linear. The curve 200 represents the increase and decrease of temperature within the freezer compartment over time. The positively sloped segments represent times when the evaporator 38 is not being cooled and the negatively sloped portions of the curve represent those times when the evaporator is providing cooling. A first point in time is designated by vertical line 202 which represents the initiation of a cooling cycle, that is the initiation of cooling by the freezer evaporator 38. A subsequent vertical line 204 represents a subsequent initiation of the cooling cycle by the evaporator.

In this improved cycle, a signal is generated by the control 48 after a preselected number of hours of freezer mode run time. Vertical line 206 represents the point in time such a signal is generated. However, the defrost heater is not energized by the control upon the generation of signal at time 206. The defrost heater is energized only after any then ongoing cooling cycle is terminated and the freezer compartment temperature has risen to the high limit set point used during normal cycle operation. That is, in the illustration of FIG. 13, the defrost heater will not be energized until time represented at line 204. This reduces the amount of defrost heater on time required to bring the evaporator plenum temperature up to the frost melt point and it eliminates freezer mode cooling just prior to defrost. Thus, the maximum effect of any ongoing cooling cycle will be taken advantage of.

In some cycle operations, the operation of the fresh food compartment evaporator 40 may occur independently of the freezer defrost control. Thus, during the freezer defrost period, the fresh food circuit can be run to cool that respective compartment. However, since commercial embodiments of the compressor 34 and defrost heaters require a current draw which may exceed standard 15 ampere fuses/circuit breakers used in the United States, a second cycle step may be used.

The second cycle step does not allow fresh food cooling while the defrost heater is being energized. However, following the energization of the defrost heater there is a soak and drain portion of the defrost cycle which does not require a significant current drain. Thus, the fresh food circuit may operate during the soak and drain portion of the defrost. By allowing this semi-independent fresh food control, the fresh food compartment can be cooled eve while the freezer circuit is off-line.

After the defrost period is over, the freezer temperature sensor 47 will call for a cooling and the cooling system should then be ready to dedicate operation of the freezer evaporator 38 to defrost recovery, in accordance with the steps outlined with respect to those described in FIG. 12.

Another improvement to the efficiency of the system is to use latching-type on/off solenoid valves. As was described above, during the "off" cycle the fresh food circuit through lines 56 and 68 was left open to equalize the pressure across compressor 34 to assist in the start-up of the compressor. This permitted migration of refrigerant through the fresh food compartment evaporator 40 and thus provides a potential for thermal input into the fresh food compartment 30 during the entire time that the refrigeration apparatus is "off". Since it only requires three to four minutes for the pressures to equalize across the compressor 34 when the fresh food circuit is opened, an enhancement to the cycle is to use latching solenoid valves that do not use electrical power to remain closed, or open, but yet require only minimal energy to switch the valves between an off and on position. Thus, the freezer circuit and fresh food circuit can remain "closed" during the majority of the time that the refrigeration mechanism is in an "off"

mode, and then three to four minutes prior to initiation of the compressor, the valve closing the fresh food circuit can be briefly energized to move it to an open position thereby allowing equalization of the pressure across the compressor prior to its start up.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The embodiments of the invention in which an exclusive property or privilege is claimed are defined as follows:

1. A method of operating a refrigeration appliance having at least two separate compartments to be cooled and a refrigeration device with at least two separate evaporators, one for each of said compartments, comprising:
   1) measuring a temperature in each compartment;
   2) determining a current cycle time value for each evaporator;
   3) determining a temperature difference value in each compartment from a preselected set temperature;
   4) determining a temperature-time gradient value for each compartment;
   5) mapping said determined values to linguistic values in accordance with predetermined membership functions to obtain input set values;
   6) applying predetermined logic rules to said input set values to derive values for an output set of consequents comprising first compartment evaporator on, second compartment evaporator on, and off;
   7) determining which of said output values is largest;
   8) initiating and terminating operation of said evaporators in accordance with the largest of said output values; and
   9) returning to step 1.

2. A method according to claim 1 and further including the step of operating one of said evaporators at a lower pressure than the other to produce a cooler temperature in one of the compartments than the other.

3. A method according to claim 2 including the step of evacuating refrigerant from said evaporator operated at a lower pressure prior to initiating operation of said evaporator operated at a higher pressure.

4. A method according to claim 2 wherein said refrigeration device includes a condenser cooled by a fan and further including the step of operating said fan at a higher speed when operating said higher pressure evaporator.

5. A method according to claim 1, wherein a phase change material is associated with at least one of said compartments and step 1 includes measuring the temperature of said phase change material to use as an input value in step 6.

6. A method according to claim 5, wherein a fan is associated with said compartment having said phase change material and said fan is operated in accordance with said output values.

7. A method according to claim 1, including a second set of rules to apply in the event that two or more of said consequent values are equal.

8. A method according to claim 1 including the step of periodically raising the temperature of at least one of said evaporators to effect a defrosting of water vapor condensed and frozen on said evaporator.

9. A method according to claim 8 wherein said step of raising the temperature occurs the first time after some predetermined time period when a compartment associated with said evaporator next demands cooling.

10. A method according to claim 8 wherein a step of operation of an evaporator not being defrosted is independent of whether the other evaporator is being defrosted.

11. A method according to claim 8 wherein said step of raising the temperature of an evaporator to effect a defrosting thereof is followed by a period of soaking and draining of that evaporator, and operation of the other of said evaporators is suspended only when said first evaporator is having its temperature elevated, not when it is soaking or draining.

12. A method according to claim 1 wherein said initiating and terminating operation of said evaporators is achieved in part by selectively opening and closing valves in a refrigeration circuit.

13. A method according to claim 12 wherein said step of opening and closing valves comprises briefly energizing said valves to cause them to cycle between an open and closed position where they will remain until they are again briefly energized.

14. A refrigeration appliance having at least two separate compartments to be cooled and a refrigeration device with at least two separate evaporators, one for each of said compartments, comprising:
   means for measuring the temperatures in each compartment;
   means for measuring the current cycle time for each evaporator;
   means for determining the temperature differences in each compartment from a preselected set temperature;
   means for determining a temperature-time gradient for each compartment;
   means for mapping said determined values to linguistic values in accordance with predetermined membership functions to obtain input set values;
   means for applying predetermined logic rules to said input set values to derive values for an output set of consequents comprising first compartment evaporator on, second compartment evaporator on, and off;
   means for determining which of said output values is largest; and
   means for initiating and terminating operation of said evaporators in accordance with the largest of said output values.

15. A refrigeration appliance according to claim 14 and further including means for operating one of said evaporators at a lower pressure than the other to produce a cooler temperature in one of the compartments than the other.

16. A refrigeration appliance according to claim 15 wherein said refrigeration device includes a condenser cooled by a fan and further including means for operating said fan at a higher speed when operating said higher pressure evaporator.

17. A refrigeration appliance according to claim 14 including means for periodically raising the temperature of at least one of said evaporators to effect a defrosting of water vapor condensed and frozen on said evaporator.

18. A refrigeration appliance according to claim 14, wherein said refrigeration device includes conduits for carrying a fluid refrigerant and valves positioned in said conduits which may be selectively opened and closed to initiate and terminate operation of said evaporators.

19. A method of operating a refrigeration appliance having at least two separate compartments to be cooled and a refrigeration device with at least two separate evaporators, one for each of said compartments, comprising:

1) determining a current cycle time value for each evaporator;
2) determining a temperature difference value in each compartment from a preselected set temperature;
3) determining a temperature-time gradient value for each compartment;
4) manipulating said determined values to obtain input set values;
5) applying predetermined logic rules to said input set values to derive values for an output set of consequents comprising first compartment evaporator on, second compartment evaporator on, and off;
6) determining which of said output values is largest;
7) initiating and terminating operation of said evaporators in accordance with the largest of said output values; and
8) returning to step 1.

20. A method according to claim 19, wherein a phase change material is associated with at least one of said compartments and step 1 includes measuring the temperature of said phase change material to use as an input value in step 5.

* * * * *